(12) United States Patent
Tang

(10) Patent No.: US 11,546,123 B2
(45) Date of Patent: Jan. 3, 2023

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 10 days.

(21) Appl. No.: 16/619,453

(22) PCT Filed: Jun. 9, 2017

(86) PCT No.: PCT/CN2017/087817
§ 371 (c)(1),
(2) Date: Dec. 4, 2019

(87) PCT Pub. No.: WO2018/223399
PCT Pub. Date: Dec. 13, 2018

(65) Prior Publication Data
US 2021/0152319 A1    May 20, 2021

(51) Int. Cl.
*H04L 5/00* (2006.01)
*H04L 1/18* (2006.01)
*H04W 72/12* (2009.01)

(52) U.S. Cl.
CPC .......... *H04L 5/0091* (2013.01); *H04L 1/1812* (2013.01); *H04L 5/0055* (2013.01); *H04W 72/1289* (2013.01)

(58) Field of Classification Search
CPC ... H04L 5/0091; H04L 5/0055; H04L 1/1812; H04L 5/0048; H04L 5/0053;
(Continued)

(56) References Cited

U.S. PATENT DOCUMENTS 8,917,603 B2 * 12/2014 Yang ........................ H04L 5/001
370/278
9,686,064 B2 * 6/2017 He ......................... H04L 1/1861
(Continued)

FOREIGN PATENT DOCUMENTS

CN    101841401 A    9/2010
CN    103188061 A    7/2013
(Continued)

OTHER PUBLICATIONS

3GPP TSG RAN WG1 Meeting #88bis; R1-1705013; Spokane, USA; Apr. 3-7, 2017.
(Continued)

*Primary Examiner* — Hanh N Nguyen
(74) *Attorney, Agent, or Firm* — Young Basile Hanlon & MacFarlane, P.C.

(57) ABSTRACT

Provided are a wireless communication method and device. The method includes: a network device sending first indication information, wherein the first indication information is used for indicating the format of a first downlink control channel, and the first downlink control channel is used for carrying hybrid automatic repeat request (HARQ) feedback information about a physical uplink shared channel (PUSCH) of at least one terminal device; and the network device sending the first downlink control channel having the format.

12 Claims, 7 Drawing Sheets

(58) Field of Classification Search
CPC ............ H04L 1/1861; H04W 72/1289; H04W 72/042; H04W 72/0446
See application file for complete search history.

(56) References Cited

U.S. PATENT DOCUMENTS

| | | | |
|---|---|---|---|
| 9,787,458 B2* | 10/2017 | Nguyen | .................... H04L 5/14 |
| 10,833,816 B2* | 11/2020 | Gao | ...................... H04L 1/1816 |
| 2013/0195047 A1 | 8/2013 | Koivisto et al. | |
| 2013/0301490 A1 | 11/2013 | He et al. | |
| 2014/0293843 A1* | 10/2014 | Papasakellariou | .... H04L 5/0037 370/280 |
| 2014/0348091 A1 | 11/2014 | Seo et al. | |
| 2015/0146643 A1 | 5/2015 | Fu et al. | |
| 2015/0305000 A1 | 10/2015 | Nyguyen et al. | |
| 2016/0212734 A1 | 7/2016 | He et al. | |
| 2016/0302224 A1 | 10/2016 | Khairmode et al. | |
| 2017/0019915 A1* | 1/2017 | Nogami | ................ H04L 5/0053 |

FOREIGN PATENT DOCUMENTS

| | | |
|---|---|---|
| CN | 103684705 A | 3/2014 |
| CN | 104184564 A | 12/2014 |
| CN | 105227266 A | 1/2016 |
| CN | 105493597 A | 4/2016 |
| CN | 106301670 A | 1/2017 |
| CN | 106301702 A | 1/2017 |
| CN | 106470093 A | 3/2017 |
| EP | 2757725 A1 | 7/2014 |
| EP | 2930992 A1 | 10/2015 |
| EP | 2991256 A1 | 3/2016 |
| EP | 3373486 A1 | 9/2018 |
| RU | 2473175 C2 | 1/2013 |
| WO | 2010068069 A2 | 6/2010 |
| WO | 2013134272 A1 | 9/2013 |
| WO | 2014088371 A1 | 6/2014 |
| WO | 2017024528 A1 | 2/2017 |
| WO | 2017028570 A1 | 2/2017 |
| WO | 2017078411 A1 | 5/2017 |

OTHER PUBLICATIONS

3GPP TSG-RAN WG1 Meeting #88bis; Spokane, U.S., Apr. 3-7, 2017; R1-1705193.
English translation of Russian OA for RU Application 2019141099 dated Jul. 10, 2020.
Extended Search Report for EP application 17912530.7 dated May 18, 2020.
Canada Examination Report for CA Application 3066169 dated Mar. 3, 2021.
Communication pursuant to Article 94(3) EPC Examination for EP Application 17912530.7 dated Feb. 3, 2021.
Chile Examination Report with English Translation for CL Application 2019-003517 dated Dec. 16, 2020.
India Examination Report for IN Application No. 201917051492 dated Feb. 26, 2021.
Taiwan First Examination Report with English Translation for TW Application 107117629 dated Jun. 24, 2021. (11 pages).
Lenovo, Motorola Mobility, Design of uplink HARQ-ACK feedback for efeMTC, 3GPP TSG RAN WG1 Meeting #89, R1-1707774, May 15-19, 2017. (6 pages).
Japanese Office Action with English Translation for JP Application 2019-566937 dated May 21, 2021. (6 pages).
Singapore Invitation to Respond to Written Opinion for SG Application 11201911632V dated Apr. 22, 2021. (6 pages).
Canadian Examination Report for CA Application 3066169 dated Dec. 1, 2021. (4 pages).
Japanese Office Action with English Translation for JP Application 2019566937 dated Jan. 21, 2022. (6 pages).
Korean Office Action with English Translation for KR Application 1020197036624 dated Dec. 10, 2021. (8 pages).
Singapore Notice of Eligibility for Grant for SG Application 11201911632V dated Dec. 17, 2021. (6 pages).
Australian Examination Report for AU Application 2017417612 dated Mar. 17, 2022. (3 pages).
Korean Final Rejection with English Translation for KR Application 1020197036624 dated Apr. 11, 2022. (6 pages).
Chinese Frist Office Action with English Translation for CN Application 202010070367.6 dated Mar. 3, 2022. (23 pages).
Indonesia Office Action with English Translation for ID Application P00202000143 dated Apr. 14, 2022. (6 pages).
TSG RAN, Study on New Radio Access Technology, RP-170376, 3GPP TSG RAN meeting #75, Mar. 6-9, 2017. (157 pages).
Chile Office Action with English Translation for CL Application 2019003517 dated Sep. 13, 2021. (58 pages).
Korean Office Action with English Translation for KR Application 1020197036624 dated Aug. 27, 2021. (6 pages).
Communication pursuant to Article 94(3) EPC for EP Application 17912530.7 dated Sep. 10, 2021. (6 pages).
Israel Office Action for IL Application 271203 dated Jun. 9, 2022. (5 pages).
Taiwan Notice of Rejection with English Translation for TW Application 107117629 dated Jun. 7, 2022. (6 pages).
Canadian Third Examiners Report for CA Application 3066169 dated Oct. 12, 2022.

* cited by examiner

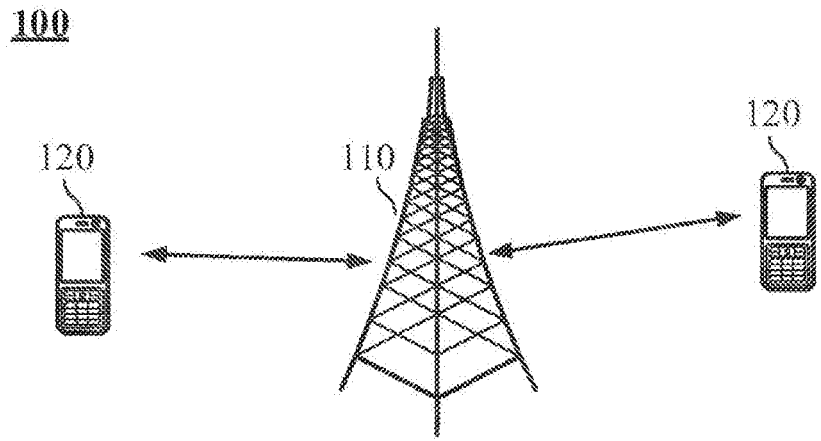

FIG. 1

A network device sends first indication information; wherein the first indication information is used for indicating a format of a first downlink control channel, and the first downlink control channel is used for carrying hybrid automatic repeat request (HARQ) feedback information of a PUSCH of at least one terminal device. — 210

The network device sends the first downlink control channel having the format. — 220

┌─────────────────────────────────────────────┐
│ A terminal device receives first indication information sent by a │
│ network device; wherein the first indication information is used for │
│ indicating a format of a first downlink control channel, and the │ ── 310
│ first downlink control channel is used for carrying hybrid automatic │
│ repeat request (HARQ) feedback information of a physical uplink │
│ shared channel (PUSCH) of at least one terminal device. │
└─────────────────────────────────────────────┘
                          │
                          ▼
┌─────────────────────────────────────────────┐
│ The terminal device detects the downlink control │
│ channel according to the format, and reads HARQ │ ── 320
│ feedback information of a PUSCH channel of the │
│ terminal device in the first downlink control channel. │
└─────────────────────────────────────────────┘

┌─────────────────────────────────────────────┐
│ A network device determines a format of a first downlink │
│ control channel according to a resource amount of first │
│ resources and a granularity of PUSCH division performed │
│ on the first resources; wherein the first downlink │
│ control channel is used for carrying HARQ feedback │ ── 410
│ information of a PUSCH of at least one terminal device; │
│ and the first resources include resources occupied by │
│ the PUSCH of the at least one terminal device. │
└─────────────────────────────────────────────┘
                          │
                          ▼
┌─────────────────────────────────────────────┐
│ The network device sends the first downlink │ ── 420
│ control channel having the format. │
└─────────────────────────────────────────────┘

```
┌─────────────────────────────────────────┐
│ A terminal device determines a format of a first downlink
│ control channel according to a resource amount of first
│ resources and a granularity of PUSCH division performed
│ on the first resources; wherein the first downlink        │── 510
│ control channel is used for carrying HARQ feedback
│ information of a PUSCH of at least one terminal device,
│ and the first resources include resources occupied by
│ the PUSCH of the at least one terminal device.
└─────────────────────────────────────────┘
                     │
                     ▼
┌─────────────────────────────────────────┐
│ The terminal device detects the first downlink control
│ channel according to the format, and reads HARQ          │── 520
│ feedback information of a PUSCH channel of the
│ terminal device in the first downlink control channel.
└─────────────────────────────────────────┘
```

FIG. 5

WIRELESS COMMUNICATION METHOD AND DEVICE

CROSS-REFERENCE TO RELATED APPLICATION(S)

This application is a 371 application of International Application No. PCT/CN2017/087817, filed on Jun. 9, 2017, the entire disclosure of which is hereby incorporated by reference.

TECHNICAL FIELD

The present disclosure relates to the field of communications, and more particularly, to a wireless communication method and device.

BACKGROUND

A base station may schedule a terminal device through a physical downlink control channel (PDCCH), and the terminal device may send a physical uplink shared channel (PUSCH) based on the scheduling of the base station.

The base station may provide feedback of reception of a PUSCH of the terminal device.

However, in different scenarios, for example, when there are different numbers of terminal devices transmitting PUSCHs in the same bandwidth, how the base station provides feedback of reception of a PUSCH is a problem to be solved urgently.

SUMMARY

Implementations of the present disclosure provide a wireless communication method and a device.

In a first aspect, a wireless communication method is provided. The method includes: sending, by a network device, first indication information, wherein the first indication information is used for indicating a format of a first downlink control channel, and the first downlink control channel is used for carrying hybrid automatic repeat request (HARQ) feedback information directed for a physical uplink shared channel (PUSCH) of at least one terminal device; and sending, by the network device, the first downlink control channel having the format.

In combination with the first aspect, in one possible implementation mode of the first aspect, before the network device sends the first indication information, the method further includes: determining the format of the first downlink control channel according to a resource amount of first resources and a granularity of PUSCH division performed on the first resources, wherein the first resources include resources occupied by the PUSCH of the at least one terminal device.

In combination with the first aspect or any above possible implementation mode thereof, in another possible implementation mode of the first aspect, the first resources include frequency domain resources selected from a full bandwidth; or the first resources include preset frequency domain resources.

In combination with the first aspect or any above possible implementation mode thereof, in another possible implementation mode of the first aspect, the format of the first downlink control channel is used for indicating a quantity of bit units included in the first downlink control channel, each bit unit includes at least one bit, the each bit unit is capable of carrying feedback information of one PUSCH, and different bit units are capable of carrying feedback information of different PUSCHs.

In combination with the first aspect or any above possible implementation mode thereof, in another possible implementation mode of the first aspect, the quantity of the bit units is equal to a ratio of the resource amount of the first resources to the granularity of PUSCH division performed on the first resources or a value to which the ratio rounds down.

In combination with the first aspect or any above possible implementation mode thereof, in another possible implementation mode of the first aspect, the bit unit includes information of Non-Acknowledge (NACK) or Acknowledge (ACK) of a corresponding PUSCH; or the bit unit includes information of NACK or ACK of a corresponding PUSCH and an HARQ process number of a PUSCH corresponding to the information of NACK or ACK.

In combination with the first aspect or any above possible implementation mode thereof, in another possible implementation mode of the first aspect, sending, by the network device, the first downlink control channel having the format, includes: determining a bit unit corresponding to each terminal device in the first downlink control channel according to information of resources occupied by a PUSCH of each terminal device among the at least one terminal device; and carrying HARQ feedback information directed for the PUSCH of each terminal device in the bit unit corresponding to each terminal device.

In combination with the first aspect or any above possible implementation mode thereof, in another possible implementation mode of the first aspect, determining the bit unit corresponding to each terminal device in the first downlink control channel according to the information of the resources occupied by the PUSCH of each terminal device among the at least one terminal device, includes: determining the bit unit corresponding to each terminal device in the first downlink control channel according to a reference resource index and the information of the resources occupied by the PUSCH of each terminal device.

In combination with the first aspect or any above possible implementation mode thereof, in another possible implementation mode of the first aspect, the reference resource index is a reference physical resource block (PRB) index and/or sub-carrier index, and the information of the resources occupied by the PUSCH is an index and/or a sub-carrier index of a used PRB.

In combination with the first aspect or any above possible implementation mode thereof, in another possible implementation mode of the first aspect, the reference resource index is an initial resource index of the first resources; wherein the first resources include the resources occupied by the PUSCH of the at least one terminal device.

In combination with the first aspect or any above possible implementation mode thereof, in another possible implementation mode of the first aspect, the method further includes: indicating, by the network device, the reference resource index through a downlink channel.

In combination with the first aspect or any above possible implementation mode thereof, in another possible implementation mode of the first aspect, the first indication information is carried in a system broadcast message, a radio resource control (RRC) dedicated signaling, an RRC reconfiguration signaling, a media access control (MAC) control unit (CE), or a physical downlink control channel (PDCCH).

In combination with the first aspect or any above possible implementation mode thereof, in another possible implementation mode of the first aspect, the first indication information is carried in a PDCCH which schedules a PUSCH directed by the first downlink control channel, or carried in a dedicated PDCCH.

In a second aspect, a wireless communication method is provided. The method includes: receiving, by a terminal device, first indication information sent by a network device; wherein the first indication information is used for indicating a format of a first downlink control channel, and the first downlink control channel is used for carrying hybrid automatic repeat request (HARQ) feedback information directed for a physical uplink shared channel (PUSCH) of at least one terminal device; and detecting, by the terminal device, the first downlink control channel according to the format, and reading HARQ feedback information of a PUSCH channel of the terminal device itself in the first downlink control channel.

In combination with the second aspect, in one possible implementation mode of the second aspect, the format of the first downlink control channel is used for indicating a quantity of bit units included in the first downlink control channel, each bit unit includes at least one bit, the each bit unit is capable of carrying feedback information of one PUSCH, and different bit units are capable of carrying feedback information of different PUSCHs.

In combination with the second aspect or any above possible implementation mode thereof, in another possible implementation mode of the second aspect, the quantity of the bit units is equal to a ratio of a resource amount of first resources to a granularity of PUSCH division performed on the first resources or a value to which the ratio rounds down.

In combination with the second aspect or any above possible implementation mode thereof, in another possible implementation mode of the second aspect, the bit unit includes information of Non-Acknowledge (NACK) or Acknowledge (ACK) of a corresponding PUSCH; or the bit unit includes information of NACK or ACK of a corresponding PUSCH and an HARQ process number of a PUSCH corresponding to the information of NACK or ACK.

In combination with the second aspect or any above possible implementation mode thereof, in another possible implementation mode of the second aspect, reading the HARQ feedback information of the PUSCH channel of the terminal device itself in the first downlink control channel, includes: determining a bit unit corresponding to the terminal device in the first downlink control channel according to information of resources occupied by the PUSCH of the terminal device; and reading the HARQ feedback information directed for the PUSCH channel of the terminal device itself in the determined bit unit.

In combination with the second aspect or any above possible implementation mode thereof, in another possible implementation mode of the second aspect, determining the bit unit corresponding to the terminal device in the first downlink control channel according to the information of the resources occupied by the PUSCH of the terminal device, includes: determining the bit unit corresponding to the terminal device in the first downlink control channel according to a reference resource index and the information of the resources occupied by the PUSCH of the terminal device.

In combination with the second aspect or any above possible implementation mode thereof, in another possible implementation mode of the second aspect, the reference resource index is a reference PRB index and/or sub-carrier index, and the information of the resources occupied by the PUSCH is an index and/or a sub-carrier index of a used PRB.

In combination with the second aspect or any above possible implementation mode thereof, in another possible implementation mode of the second aspect, the reference resource index is an initial resource index of the first resources; wherein the first resources include the resources occupied by the PUSCH of the at least one terminal device.

In combination with the second aspect or any above possible implementation mode thereof, in another possible implementation mode of the second aspect, the method further includes: receiving, by the terminal device, the reference resource index indicated by the network device through a downlink channel.

In combination with the second aspect or any above possible implementation mode thereof, in another possible implementation mode of the second aspect, the first indication information is carried in a system broadcast message, a radio resource control (RRC) dedicated signaling, an RRC reconfiguration signaling, a media access control control element, or a physical downlink control channel (PDCCH).

In combination with the second aspect or any above possible implementation mode thereof, in another possible implementation mode of the second aspect, the first indication information is carried in a PDCCH which schedules a PUSCH directed by the first downlink control channel, or carried in a dedicated PDCCH.

In a third aspect, a wireless communication method is provided. The method includes: determining, by a network device, a format of a first downlink control channel according to a resource amount of first resources and a granularity of PUSCH division performed on the first resources; wherein the first downlink control channel is used for carrying hybrid automatic repeat request (HARQ) feedback information directed for a physical uplink shared channel (PUSCH) of at least one terminal device, and the first resources include resources occupied by the PUSCH of the at least one terminal device; and sending, by the network device, the first downlink control channel having the format.

In combination with the third aspect, in one possible implementation mode of the third aspect, the first resources include frequency domain resources selected from a full bandwidth; or the first resources include preset frequency domain resources.

In combination with the third aspect or any above possible implementation mode thereof, in another possible implementation mode of the third aspect, the format of the first downlink control channel is used for indicating a quantity of bit units included in the first downlink control channel, each bit unit includes at least one bit, the each bit unit is capable of carrying feedback information of one PUSCH, and different bit units are capable of carrying feedback information of different PUSCHs.

In combination with the third aspect or any above possible implementation mode thereof, in another possible implementation mode of the third aspect, the quantity of the bit units is equal to a ratio of the resource amount of the first resources to the granularity of PUSCH division performed on the first resources or a value to which the ratio rounds down.

In combination with the third aspect or any above possible implementation mode thereof, in another possible implementation mode of the third aspect, the bit unit includes information of Non-Acknowledge (NACK) or Acknowledge (ACK) of a corresponding PUSCH; or the bit unit includes information of NACK or ACK of a corresponding PUSCH and an HARQ process number of a PUSCH corresponding to the information of NACK or ACK.

In combination with the third aspect or any above possible implementation mode thereof, in another possible implementation mode of the third aspect, sending, by the network device, the first downlink control channel having the format, includes: determining a bit unit corresponding to each terminal device in the first downlink control channel according to information of resources occupied by a PUSCH of each terminal device among the at least one terminal device; and carrying HARQ feedback information directed for the PUSCH of each terminal device in the bit unit corresponding to each terminal device.

In combination with the third aspect or any above possible implementation mode thereof, in another possible implementation mode of the third aspect, determining the bit unit corresponding to each terminal device in the first downlink control channel according to the information of the resources occupied by the PUSCH of each terminal device among the at least one terminal device, includes: determining the bit unit corresponding to each terminal device in the first downlink control channel according to a reference resource index and the information of the resources occupied by the PUSCH of each terminal device.

In combination with the third aspect or any above possible implementation mode thereof, in another possible implementation mode of the third aspect, the reference resource index is a reference PRB index and/or sub-carrier index, and the information of the resources occupied by the PUSCH is an index and/or a sub-carrier index of a used PRB.

In combination with the third aspect or any above possible implementation mode thereof, in another possible implementation mode of the third aspect, the reference resource index is an initial resource index of the first resources.

In combination with the third aspect or any above possible implementation mode thereof, in another possible implementation mode of the third aspect, the method further includes: indicating, by the network device, the reference resource index through a downlink channel.

In a fourth aspect, a wireless communication method is provided. The method includes: determining, by a terminal device, a format of a first downlink control channel according to a resource amount of first resources and a granularity of PUSCH division performed on the first resources, wherein the first downlink control channel is used for carrying hybrid automatic repeat request (HARQ) feedback information directed for a physical uplink shared channel (PUSCH) of at least one terminal device, and the first resources include resources occupied by the PUSCH of the at least one terminal device; and detecting, by the terminal device, the first downlink control channel according to the format, and reading HARQ feedback information of a PUSCH channel of the terminal device itself in the first downlink control channel.

In combination with the fourth aspect, in one possible implementation mode of the fourth aspect, the format of the first downlink control channel is used for indicating a quantity of bit units included in the first downlink control channel, each bit unit includes at least one bit, the each bit unit is capable of carrying feedback information of one PUSCH, and different bit units are capable of carrying feedback information of different PUSCHs.

In combination with the fourth aspect or any above possible implementation mode thereof, in another possible implementation mode of the fourth aspect, the quantity of the bit units is equal to a ratio of the resource amount of first resources to the granularity of PUSCH division performed on the first resources or a value to which the ratio rounds down.

In combination with the fourth aspect or any above possible implementation mode thereof, in another possible implementation mode of the fourth aspect, the bit unit includes information of Non-Acknowledge (NACK) or Acknowledge (ACK) of a corresponding PUSCH; or the bit unit includes information of NACK or ACK of a corresponding PUSCH and an HARQ process number of a PUSCH corresponding to the information of NACK or ACK.

In combination with the fourth aspect or any above possible implementation mode thereof, in another possible implementation mode of the fourth aspect, reading the HARQ feedback information of the PUSCH channel of the terminal device itself in the first downlink control channel, includes: determining a bit unit corresponding to the terminal device in the first downlink control channel according to information of resources occupied by the PUSCH of the terminal device; and reading the HARQ feedback information directed for the PUSCH channel of the terminal device itself in the determined bit unit.

In combination with the fourth aspect or any above possible implementation mode thereof, in another possible implementation mode of the fourth aspect, determining the bit unit corresponding to the terminal device in the first downlink control channel according to the information of the resources occupied by the PUSCH of the terminal device, includes: determining the bit unit corresponding to the terminal device in the first downlink control channel according to a reference resource index and the information of the resources occupied by the PUSCH of the terminal device.

In combination with the fourth aspect or any above possible implementation mode thereof, in another possible implementation mode of the fourth aspect, the reference resource index is a reference PRB index and/or sub-carrier index, and the information of the resources occupied by the PUSCH is an index and/or a sub-carrier index of a used PRB.

In combination with the fourth aspect or any above possible implementation mode thereof, in another possible implementation mode of the fourth aspect, the reference resource index is an initial resource index of the first resources.

In combination with the fourth aspect or any above possible implementation mode thereof, in another possible implementation mode of the fourth aspect, the method further includes: receiving, by the terminal device, the reference resource index indicated by the network device through a downlink channel.

In a fifth aspect, a network device is provided for performing the method in the first aspect or any possible implementation mode of the first aspect or in the third aspect or any possible implementation mode of the third aspect described above. Specifically, the network device includes function modules used for executing the method in the first aspect or any possible implementation mode of the first aspect or in the third aspect or any possible implementation mode of the third aspect described above.

In a sixth aspect, a terminal device is provided for performing the method in the second aspect or any possible implementation mode of the second aspect or in the fourth aspect or any possible implementation mode of the fourth aspect described above. Specifically, the terminal device includes function modules used for executing the method in the second aspect or any possible implementation mode of the second aspect or in the fourth aspect or any possible implementation mode of the fourth aspect described above.

In a seventh aspect, a network device is provided, which includes a processor, a memory, and a transceiver. The processor, the memory, and the transceiver communicate with each other through internal connection paths to transfer control and/or data signals, so that the network device executes the method in the first aspect or any possible implementation mode of the first aspect or in the third aspect or any possible implementation mode of the third aspect described above.

In an eighth aspect, a terminal device is provided, which includes a processor, a memory, and a transceiver. The processor, the memory, and the transceiver communicate with each other through internal connection paths to transfer control and/or data signals, so that the terminal device executes the method in the second aspect or any possible implementation mode of the second aspect or in the fourth aspect or any possible implementation mode of the fourth aspect described above.

In a ninth aspect, a computer readable medium for storing a computer program is provided. The computer program includes instructions for executing any method or any possible implementation mode of the method described above.

In a tenth aspect, a computer program product containing instructions is provided. When running on a computer, the computer program product causes the computer to execute any method or the method in any possible implementation mode described above.

BRIEF DESCRIPTION OF DRAWINGS

To describe the technical solution of implementations of the present disclosure more clearly, accompanying drawings that need to be used in the description of implementations or the prior art will be briefly introduced below. It is apparent that the accompanying drawings described below are only some implementations of the present disclosure; and for a person of ordinary skill in the art, other drawings may be obtained according to these drawings without paying an inventive effort.

FIG. 1 is a schematic diagram of a wireless communication system according to an implementation of the present disclosure.

FIG. 2 is a schematic flowchart of a wireless communication method according to an implementation of the present disclosure.

FIG. 3 is a schematic flowchart of a wireless communication method according to an implementation of the present disclosure.

FIG. 4 is a schematic flowchart of a wireless communication method according to an implementation of the present disclosure.

FIG. 5 is a schematic flowchart of a wireless communication method according to an implementation of the present disclosure.

DETAILED DESCRIPTION

Figure 6:
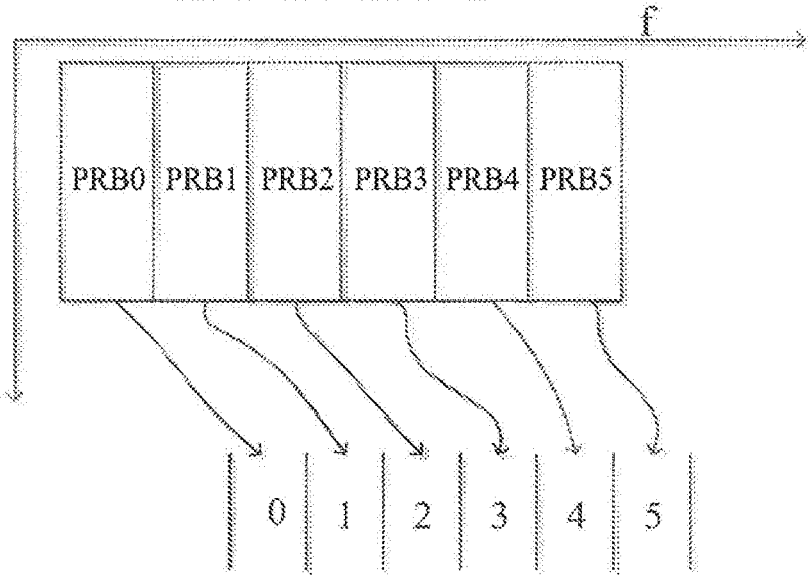
FIG. 6 is a mapping diagram between PUSCH and bit units of feedback information for transmitting HARQ in DCI according to an implementation of the present disclosure.

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solution of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, terminal direct connection (Device to Device, D2D) communication may be performed between the terminal devices 120.

Optionally, the 5G system or network may also be referred to as a New Radio (NR) system or network.

FIG. 1 illustrates one network device and two terminal devices. Optionally, the wireless communication system 100 may include multiple network devices, and another quantity of terminal devices may be included within the coverage area of each network device, which is not restricted in implementations of the present disclosure.

Optionally, the wireless communication system 100 may further include other network entities such as a network controller, a mobile management entity, and this is not restricted in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flowchart of a wireless communication method 200 according to an implementation of the present disclosure. The method 200 may optionally be applied to the system shown in FIG. 1, but is not limited thereto. As shown in FIG. 2, the method 200 includes at least a part of the following contents: acts 210 and 220.

In act 210, a network device sends first indication information; wherein the first indication information is used for indicating a format of a first downlink control channel, and the first downlink control channel is used for carrying hybrid automatic repeat request (HARQ) feedback information of a PUSCH of at least one terminal device.

In act 220, the network device sends the first downlink control channel having the format.

FIG. 3 is a schematic flowchart of a wireless communication method 300 according to an implementation of the present disclosure. The method 300 may optionally be applied to the system shown in FIG. 1, but is not limited thereto. As shown in FIG. 3, the method 300 includes at least a part of the following contents: acts 310 and 320.

In act 310, a terminal device receives first indication information sent by a network device; wherein the first indication information is used for indicating a format of a first downlink control channel, and the first downlink control channel is used for carrying hybrid automatic repeat request (HARQ) feedback information of a physical uplink shared channel (PUSCH) of at least one terminal device.

In act 320, the terminal device detects the first downlink control channel according to the format, and reads HARQ feedback information of a PUSCH channel of the terminal device in the first downlink control channel.

FIG. 4 is a schematic flowchart of a wireless communication method 400 according to an implementation of the present disclosure. The method may optionally be applied to the system shown in FIG. 1, but is not limited thereto. As shown in FIG. 4, the method 400 includes at least a part of the following contents: acts 410 and 420.

In act 410, a network device determines a format of a first downlink control channel according to a resource amount of first resources and a granularity of PUSCH division performed on the first resources; wherein the first downlink control channel is used for carrying HARQ feedback information of a PUSCH of at least one terminal device; and the first resources include resources occupied by the PUSCH of the at least one terminal device.

In act 420, the network device sends the first downlink control channel having the format.

FIG. 5 is a schematic flowchart of a wireless communication method 500 according to an implementation of the present disclosure. The method may optionally be applied to the system shown in FIG. 1, but is not limited thereto. As shown in FIG. 5, the method 500 includes at least a part of the following contents: acts 510 and 520.

In act 510, a terminal device determines a format of a first downlink control channel according to a resource amount of first resources and a granularity of PUSCH division performed on the first resources; wherein the first downlink control channel is used for carrying HARQ feedback information of a PUSCH of at least one terminal device, and the first resources include resources occupied by the PUSCH of the at least one terminal device.

In act 520, the terminal device detects the first downlink control channel according to the format, and reads HARQ feedback information of a PUSCH channel of the terminal device in the first downlink control channel.

According to a method of an implementation of the present disclosure, a terminal device or a network device may determine a format of a downlink control channel used for transmitting HARQ feedback information of a PUSCH as needed. Therefore, a situation that a downlink control channel of a fixed length (for example, the maximum length needed in various scenarios) is adopted can be avoided in various scenarios, thereby improving transmission efficiency of a downlink control channel and decreasing power consumption of a terminal device for receiving a downlink control channel.

For example, for various scenarios, in different scenarios, the quantities of PUSCHs which may be scheduled simultaneously on the fixed resources are different in different scenarios, then the amount of information required to be carried by the downlink control channel for transmitting HARQ feedback information of the PUSCH is different. If the network device adopts the maximum length required in various scenarios as the length of the downlink control channel, the transmission efficiency of the downlink control channel will be reduced. When the quantity of the bits needing to be received by the terminal device is large, the power consumption of the terminal device for receiving the downlink control channel may be increased.

Therefore, according to implementations of the present disclosure, a terminal device or a network device may determine a format of a downlink control channel used for transmitting HARQ feedback information of a PUSCH as needed. This can enhance transmission efficiency of a downlink control channel and reduce power consumption of a terminal device.

In order to understand the present disclosure more clearly, optional solutions of the present disclosure will be described in detail below. It should be understood that the solutions described below may be applied to methods 200, 300, 400, or 500.

The solutions of implementations of the present disclosure may be applied to various communication systems.

In an implementation of the present disclosure, a communication system may be a machine type communication (MTC) communication system (e.g., an LTE enhanced MTC (eMTC) system, or an even further enhanced MTC (EFEMTC) system), which may support an MTC terminal device with 1.4 MHz radio frequency bandwidth capability, or may support an MTC terminal device with 3 MHz or 5 MHz radio frequency bandwidth capability.

Optionally, when an implementation of the present disclosure is applied to an MTC communication system, a downlink control channel mentioned in the implementation of the present disclosure may be an MTC physical downlink control channel (MPDCCH), and a PUSCH may be an MTC physical uplink shared channel (MPUSCH).

Optionally, HARQ feedback information mentioned in an implementation of the present disclosure may be information of Acknowledge (ACK) or Non-Acknowledge (NACK).

Optionally, the first downlink control channel of an implementation of the present disclosure may carry HARQ ACK/NACK information for an MPUSCH by carrying a new data indication (NDI) bit.

Optionally, in an implementation of the present disclosure, the network device or the terminal device may determine the format of the first downlink control channel according to a resource amount of first resources and a granularity of PUSCH division performed on the first resources, wherein the first resources include resources occupied by the PUSCH of the at least one terminal device.

Specifically, the network device or the terminal device may determine the format of the first downlink control channel according to a ratio of the resource amount of the first resources to the granularity of the PUSCH division performed on the first resources.

Optionally, in the frequency domain, the first resources include a bandwidth which may be used for transmitting a PUSCH in a system (eg, MTC system), and the bandwidth may optionally be 1.4 MHz, 3 MHz, 5 MHz or the like.

Optionally, the first resources may include frequency domain resources selected from full bandwidth by the network device. For example, the network device may select frequency domain resources from the full bandwidth according to an occupation situation of the bandwidth in the current network and/or an interference situation between bandwidths.

Optionally, after selecting the frequency domain resources, the network device may determine the format of the first downlink control channel according to the frequency domain resources, and notify the terminal device of the format. Optionally, after selecting the frequency domain resources, the network device may notify a specific location and/or size of the frequency domain resources to the terminal device, and the terminal device may determine the format of the first downlink control channel according to the resource amount of the frequency domain resources.

Optionally, the first resources may include preset frequency domain resources. The preset frequency domain resources may be manually preset. The preset frequency domain resources may be full bandwidth resources or a part of full bandwidth resources.

Specifically, the information of the frequency domain resources may be preset on the network device, and the network device, according to the preset resources, determines the format of the first downlink control channel and notifies the format to the terminal device. Alternatively, the network device may notify the terminal device of information (e.g., size and/or location of resources) of the preset frequency domain resources, and the terminal device may determine the format of the first downlink control channel according to the resource amount of the preset frequency domain resources.

Alternatively, the information of the frequency domain resources may be preset on the terminal device and the network device, and the terminal device and the network device may separately determine the format of the first downlink control channel according to the resource amount of the preset frequency domain resources.

Optionally, when the terminal device itself determines the format of the first downlink control channel according to the resource amount of the first resources, the granularity used for the PUSCH division performed on the first resources may be determined according to the size of the resources occupied by the PUSCH (which may be a previous PUSCH or a PUSCH directed by the current first downlink control channel) sent by the terminal device.

Optionally, the full bandwidth may be all the bandwidths used for some transmission.

Optionally, the full bandwidth may be a narrow bandwidth.

Optionally, the full bandwidth may be a full bandwidth of 1.4 MHz, 3 MHz or 5 MHz in an MTC system.

Optionally, the format of the first downlink control channel may be used for indicating the payload size in the first downlink control channel. Specifically, the format of the first downlink control channel is used for indicating the quantity of bit units included in the first downlink control channel, each bit unit includes at least one bit, each bit unit may be used for carrying feedback information of one PUSCH, and different bit units may be used for carrying feedback information of different PUSCHs.

In an implementation mode, when a ratio of the resource amount of the first resources to the granularity of PUSCH division performed on the first resources is some integer, the quantity of the bit units included in the first downlink control channel is equal to the integer.

In another implementation mode, when a ratio of the resource amount of the first resources to the granularity of PUSCH division performed on the first resources is not an integer, the quantity of the bit units included in the first downlink control channel is equal to a value to which the ratio rounds down.

In the following, an MTC terminal is taken as an example, and two scenarios are combined to describe how to perform format selection.

For example, the same uplink narrow band contains 6 physical resource blocks (PRBs). If one PUSCH is allocated with one PRB, then the HARQ feedback information of at most 6 PUSCHs is multiplexed in the same MPDCCH, and the format of the first downlink control channel may be selected as an MPDCCH with 6 bit units.

If one PUSCH allocates 3 PRBs, the HARQ ACKs or NACKs of at most 2 PUSCHs of the uplink narrow band are multiplexed in the same MPDCCH. In this case, the format of the first downlink control channel may be selected as an MPDCCH with 2 bit units.

For example, a sub-PRB may be used as the granularity. For example, 3 sub-carriers are used as the granularity for resource allocation, so that one uplink narrow band would have 24 PUSCH HARQ ACKs or NACKs multiplexed in the same MPDCCH if 3 sub-carriers are allocated for each PUSCH. In this case, the format of the first downlink control channel may be selected as an MPDCCH with 24 bit units.

It should be understood that in an implementation of the present disclosure, each bit unit may be used for carrying feedback information of one PUSCH, which means that not all of the bit units have to be used for carrying the HARQ feedback information of the PUSCH, and only indicates that each bit unit has the capability of carrying HARQ.

For example, the same uplink narrow band contains 6 PRBs. If one PUSCH is allocated with one PRB, then the HARQ feedback information of at most 6 PUSCHs is multiplexed in the same MPDCCH. If only 3 terminal devices need to be scheduled at present, and only one PRB needs to be occupied for the data volume of each terminal device, an MPDCCH containing 6 bit units may be selected, and 3 bit units in these 6 bit units carry HARQ feedback information of the corresponding PUSCH.

Optionally, in an implementation of the present disclosure, one terminal device allocates one PUSCH occupying multiple PUSCH granularities, and when the terminal device allocates one PUSCH occupying multiple PUSCH granularities, the terminal device may read the HARQ information of the PUSCH of the terminal device from the multiple bit units.

Optionally, in an implementation of the present disclosure, the different bit units may be used for carrying the HARQ feedback information of different PUSCHs, which refers to: when the PUSCH division is performed according to the granularity of the PUSCH, the bit unit carries the HARQ feedback information of the PUSCH obtained by using such PUSCH granularity division, PUSCHs which include resources with multiple PUSCH granularities may be scheduled to the same terminal device, and the terminal device may perform separate coding or uniform coding on the PUSCH which includes multiple PUSCH granularities respectively.

Optionally, in an implementation of the present disclosure, in addition to that the format of the first downlink control channel is determined according to a resource amount of first resources and a PUSCH granularity of PUSCH division performed on the first resources, the format of the first downlink control channel may also be determined according to other factors. For example, the network device may determine the format of the first downlink control channel according to the quantity of terminal devices currently scheduled.

It should be understood that in an implementation of the present disclosure, the first downlink control channel may further include a bit or bit unit for carrying other information, in addition to a bit unit which may be used for carrying the HARQ feedback information of the PUSCH as mentioned in implementations of the present disclosure.

It should be understood that the bit unit in an implementations of the present disclosure may also be referred to as a feedback bit or bit.

Optionally, the first indication information mentioned in an implementation of the present disclosure is carried in a system broadcast message, a radio resource control (RRC) dedicated signaling, an RRC reconfiguration signaling, a media access control (MAC) control element (CE), or a PDCCH.

In an implementation mode, the first indication information may be carried in a PDCCH which schedules a PUSCH directed by the first downlink control channel.

Specifically, when the network device schedules the PUSCH, the format of the downlink control channel which performs HARQ feedback on the PUSCH may be sent to the terminal device through the PDCCH which schedules the PUSCH. For example, a bit field indicating the format of the downlink control channel may be set in Downlink Control Information (DCI) of the PDCCH channel which schedules the PUSCH.

In another implementation mode, the first indication information may be carried in a dedicated PDCCH.

Specifically, the dedicated PDCCH channel is a PDCCH sent in a PDCCH common search space, and the network side sends the dedicated PDCCH channel in the PDCCHs sent in the PDCCH common search space when the format of the downlink control channel needs to be changed.

Optionally, the bit unit in an implementation of the present disclosure includes information of NACK or ACK of a corresponding PUSCH, or includes information of NACK or ACK of a corresponding PUSCH and an HARQ process number of a PUSCH corresponding to the information of NACK or ACK.

For example, one bit may be used to indicate two formats, or 2 bits may be used to indicate 4 formats (as shown in table 1). DCI of different formats carries different payload of HARQ feedback, so as to support HARQ feedback bits of different PUSCHs being multiplexed in the same DCI. For example, the formats 0, 1, 2 and 3 in table 1 may carry feedback information of 3, 6, 12 and 24 PUSCH channels respectively.

TABLE 1

Mapping mode by using DCI bits to indicate format of downlink control channel

| Bits for indicating format | 00 | 01 | 10 | 11 |
| --- | --- | --- | --- | --- |
| Indicated Format of downlink control channel | Format 0 | Format 1 | Format 2 | Format 3 |
| Quantity of supported feedback users (Quantity of PUSCHs) | 3 | 6 | 12 | 24 |
| Quantity of HARQ feedback bits in DCI (if one bit is used for each PUSCH) | 3 | 6 | 12 | 24 |
| Quantity of HARQ feedback bits in DCI (if X bits is used for each PUSCH) | 3X | 6X | 12X | 24X |

For each PUSCH, one bit of the HARQ feedback may be carried, such as a feedback bit "0" or "1" which respectively indicates ACK or NACK feedback (in this case, the total quantity of HARQ feedback bits in the DCI is shown in the 4th row of table 1). Optionally, x bits may be carried wherein the x bits include at least one bit of HARQ feedback and the HARQ process number of the PUSCH corresponding to the feedback bit (in this case, the total quantity of HARQ feedback bits in the DCI is shown in the 5th row of table 1).

Optionally, in addition to determining the format of the first downlink control channel, the terminal device or the network device in an implementation of the present disclosure may further determine a specific bit unit occupied by the terminal device in the first downlink control channel.

For a network device, the network device may determine a bit unit corresponding to each terminal device in the first downlink control channel according to information of the resources occupied by a PUSCH of each terminal device among the at least one terminal device. HARQ feedback information directed for a PUSCH of each terminal device is carried in the bit unit corresponding to each terminal device.

Further, the network device may determine a bit unit corresponding to each terminal device in the first downlink control channel according to a reference resource index and the information of the resources occupied by the PUSCH of each terminal device.

For a terminal device, the terminal device may determine a bit unit corresponding to the terminal device in the first downlink control channel according to the information of the resources occupied by the PUSCH of the terminal device. HARQ feedback information directed for the PUSCH channel of the terminal device itself is read in the determined bit unit.

For example, if the format of the first downlink control channel is the format 1 in table 1, the first downlink control channel carries the HARQ feedback bits of 6 PUSCHs. The terminal device may determine a position of the HARQ feedback bit of the PUSCH in the downlink control channel according to a position of an initial PRB occupied by the PUSCH in the MTC bandwidth.

Further, the terminal device may determine a bit unit corresponding to the terminal device in the first downlink control channel according to a reference resource index and the information of the resources occupied by the PUSCH of the terminal device.

Optionally, in an implementation of the present disclosure, the network device may indicate a reference resource index to a terminal device through a downlink channel.

Optionally, the reference resource index may be carried in a system broadcast message, an RRC dedicated signaling, an RRC reconfiguration signaling, a media access control control element, or a PDCCH.

In an implementation mode, the reference resource index may be carried in a PDCCH which schedules a PUSCH or carried in a dedicated PDCCH.

Optionally, the reference resource index mentioned in an implementation of the present disclosure is a reference PRB index and/or sub-carrier index. The information of the resources occupied by the PUSCH used for determining the bit unit of the terminal device mentioned in an implementation of the present disclosure is an index and/or a sub-carrier index of the PRB used by the terminal device.

Optionally, the reference resource index may be an initial resource index of the above-mentioned first resources, such as the initial PRB index or the initial sub-carrier index of the first resources.

In an implementation of the present disclosure, by configuring the reference resource index, the network device may use different PUSCH division granularities in different resources, the bit units of the PUSCHs with the same division granularity may be multiplexed in the same downlink control channel, so that the scheduling flexibility of the network device is improved.

Optionally, in an implementation of the present disclosure, the information of the resources occupied by the PUSCH used for determining the bit unit of the terminal device includes an initial PRB index or an initial sub-carrier index of the resources occupied by the PUSCH.

Optionally, in an implementation of the present disclosure, when the PUSCH allocated to the terminal device includes resources with multiple PUSCH granularities, the terminal device may determine the occupied bit unit according to the initial PRB index and/or sub-carrier index of the PUSCH. After the bit unit is determined, the HARQ feedback information of the PUSCH may be read only from the bit unit. In other words, the network device only carries the HARQ feedback information of the PUSCH on one bit unit.

Optionally, the terminal device may also read feedback information of the PUSCH in multiple bit units corresponding to multiple PUSCH granularities included in the PUSCH. In other words, each bit unit carries HARQ feedback information, and the feedback information carried by each bit unit may be the same. In other words, the network device may carry feedback information in each bit unit of multiple bit units.

In an implementation mode, if the division granularity (in the unit of a PRB) of the PUSCH is greater than or equal to one PRB, then the bit unit index of the HARQ feedback information of a PUSCH=the initial PRB index of the PUSCH/(the division granularity of the PUSCH).

In another implementation mode, if the division granularity of the PUSCH is smaller than one PRB (in the unit of a sub-carrier), then the bit unit index of the HARQ feedback information of a PUSCH=the initial PRB index of the PUSCH*(12/the PUSCH division granularity)+mode (the initial sub-carrier index of the PUSCH in the initial PRB, the division granularity of the PUSCH).

In an implementation mode, if the division granularity of the PUSCH is greater than or equal to one PRB, then the bit unit index of the HARQ feedback information of a PUSCH= (the initial PRB index of the PUSCH−the reference PRB index)/(the division granularity of the PUSCH resources).

In an implementation mode, if the PUSCH resource allocation granularity is smaller than one PRB (in the unit of a sub-carrier), then the bit unit index of the HARQ feedback information of a PUSCH=(the initial PRB index of the PUSCH−the reference PRB index)*(12/the PUSCH division granularity)+mode (the initial sub-carrier index of the PUSCH in the initial PRB, the division granularity of the PUSCH).

In order to understand the present disclosure more clearly, the following describes how to determine a position of a bit unit, and the following examples may be applied to a terminal device and a network device.

Example A

For example, as shown in FIG. 6, it is assumed that the MTC bandwidth is 6 PRB, and the division granularity of the PUSCH is PRB. If the initial PRB of the PUSCH is the PRB 0 in the MTC bandwidth, the bit unit carrying the feedback information of the HARQ of the PUSCH is a first bit unit for feeding back HARQ feedback information in the DCI. If the initial PRB of the PUSCH is the PRB 1 in the MTC bandwidth, the bit unit carrying the feedback information of the HARQ of the PUSCH is a second bit unit for feeding back HARQ feedback information in the DCI, and so on.

Example B

Figure 7:
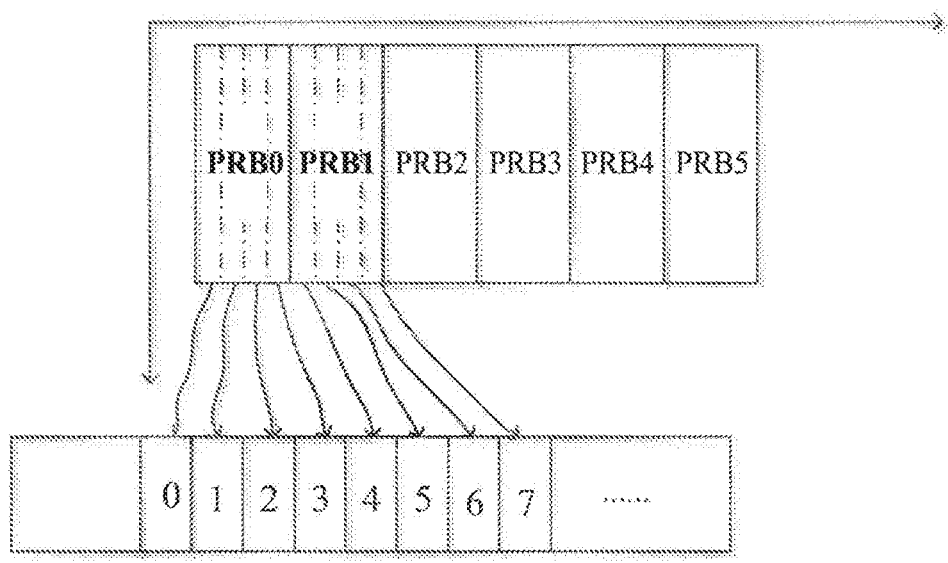
FIG. 7 is a mapping diagram between PUSCH and bit units of feedback information for transmitting HARQ in DCI according to an implementation of the present disclosure.

For example, as shown in FIG. 7, the MTC bandwidth is 6 PRBs, the division granularity of the PUSCH is 3 sub-carriers, and the 1 PRB includes 12 sub-carriers which may transmit a total of at most 4 PUSCHs. If the initial PRB of the PUSCH is the PRB 0 in the MTC bandwidth, and the initial sub-carrier is the sub-carrier 0, the bit unit carrying the feedback information of the HARQ of the PUSCH is a first bit unit used for feeding back HARQ feedback information in the DCI. If the initial PRB of the PUSCH is the PRB 0 in the MTC bandwidth, and the initial sub-carrier is the sub-carrier 3, the bit unit carrying the feedback information of the HARQ of the PUSCH is a first bit unit used for feeding back HARQ feedback information in the DCI. If the initial PRB of the PUSCH is the PRB 1 in the MTC bandwidth, and the initial sub-carrier is the sub-carrier 0, the bit unit carrying the feedback information of the HARQ of the PUSCH is a 5th bit unit used for feeding back HARQ feedback information in the DCI, and so on.

Example C

For example, it is assumed that the MTC bandwidth is 6 PRB, and the division granularity of the PUSCH is PRB. The reference PRB is PRB2. If the initial PRB of the PUSCH is the PRB 2 in the MTC bandwidth, the bit unit carrying the feedback information of the HARQ of the PUSCH is a first bit unit for feeding back HARQ feedback information in the DCI. Similarly, if the initial PRB of the PUSCH is the PRB 3 in the MTC bandwidth, the bit unit carrying the feedback information of the HARQ of the PUSCH is a second bit unit used for feeding back HARQ feedback information in the DCI.

Example D

Figure 8:
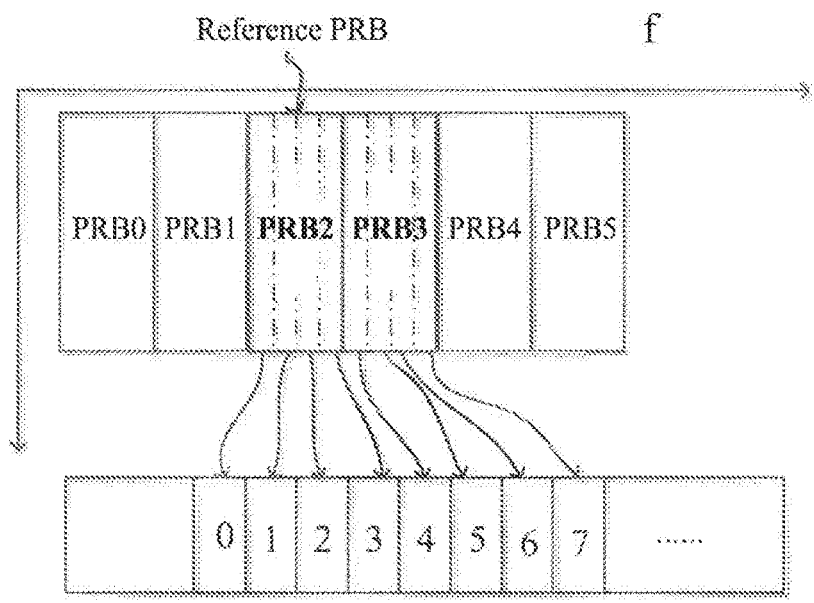
FIG. 8 is a mapping diagram between PUSCH and bit units of feedback information for transmitting HARQ in DCI according to an implementation of the present disclosure.

For example, as shown in FIG. 8, the MTC bandwidth is 6 PRBs, the division granularity of the PUSCH is 3 sub-carriers, and the 1 PRB includes 12 sub-carriers which may transmit a total of at most 4 PUSCHs. The reference PRB is PRB2. If the initial PRB of the PUSCH is the PRB 2 in the MTC bandwidth, and the initial sub-carrier is the sub-carrier 0, the bit unit carrying the feedback information of the HARQ of the PUSCH is a first bit unit used for feeding back HARQ feedback information in the DCI. Similarly, if the initial PRB of the PUSCH is the PRB 2 in the MTC bandwidth, and the initial sub-carrier is the sub-carrier 3, the bit unit carrying the feedback information of the HARQ of the PUSCH is a second bit unit used for feeding back HARQ feedback information in the DCI. If the initial PRB of the PUSCH is the PRB 3 in the MTC bandwidth, and the initial sub-carrier is the sub-carrier 0, the bit unit carrying the feedback information of the HARQ of the PUSCH is a 5th bit unit used for feeding back HARQ feedback information in the DCI, and so on.

In an implementation of the present disclosure, by configuring the reference PRB, the network device may use different PUSCH division granularities in different PRBs or PRB groups, the bit units of the PUSCHs with the same division granularity may be multiplexed in the same downlink control channel. As shown in FIG. 8, the PRB 2 and the PRB 3 may transmit the PUSCH with the resource allocation granularity of three sub-carriers, while other PRBs may adopt the PUSCH resource allocation granularity of 1 PRB, so that the scheduling flexibility of the network device is improved.

Figure 9:
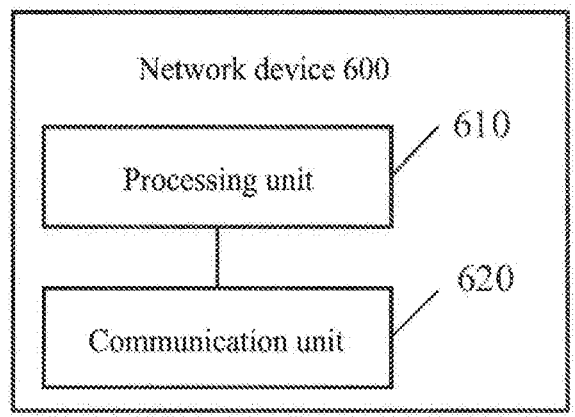
FIG. 9 is a schematic block diagram of a network device according to an implementation of the present disclosure.

FIG. 9 is a schematic block diagram of a network device 600 according to an implementation of the present disclosure. As shown in FIG. 9, the network device 600 includes a processing unit 610 and a communication unit 620.

Optionally, the processing unit 610 is used for: determining a format of a first downlink control channel, wherein the first downlink control channel is used for carrying hybrid automatic repeat request (HARQ) feedback information directed for a physical uplink shared channel (PUSCH) of at least one terminal device. The communication unit 620 is used for sending first indication information, wherein the first indication information is used for indicating the format of the first downlink control channel; and sending the first downlink control channel having the format.

Optionally, the processing unit 610 is used for: determining the format of the first downlink control channel according to a resource amount of first resources and a granularity of PUSCH division performed on the first resources. The first downlink control channel is used for carrying hybrid automatic repeat request (HARQ) feedback information directed for a physical uplink shared channel (PUSCH) of at least one terminal device. The first resources include resources occupied by the PUSCH of the at least one terminal device. The communication unit 620 is used for: sending the first downlink control channel having the format.

It should be understood that, the network device 600 may implement corresponding operations performed by the network device in the method implementation. For sake of conciseness, the specific description will not be repeated here.

Figure 10:
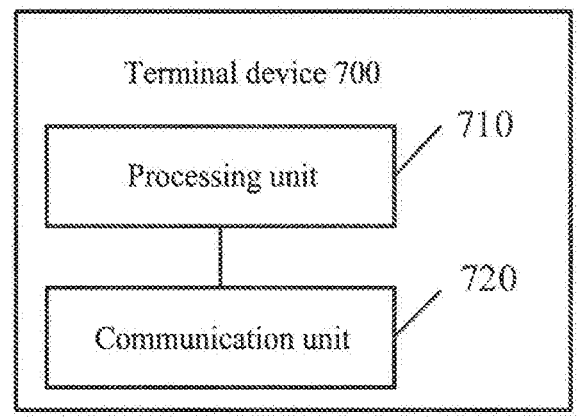
FIG. 10 is a schematic block diagram of a terminal device according to an implementation of the present disclosure.

FIG. 10 is a schematic block diagram of a terminal device 700 according to an implementation of the present disclosure. As shown in FIG. 10, the terminal device 700 includes a processing unit 710 and a communication unit 720.

Optionally, the communication unit 720 is used for: receiving first indication information sent by a network device, wherein the first indication information is used for indicating a format of a first downlink control channel, and the first downlink control channel is used for carrying hybrid automatic repeat request (HARQ) feedback information directed for a physical uplink shared channel (PUSCH) of at least one terminal device; and detecting the first downlink control channel according to the format.

The processing unit 710 is used for: reading HARQ feedback information of a PUSCH channel of the terminal device itself in the first downlink control channel.

Optionally, the processing unit 710 is used for determining the format of the first downlink control channel according to a resource amount of first resources and a granularity of PUSCH division performed on the first resources. The first downlink control channel is used for carrying hybrid automatic repeat request (HARQ) feedback information directed for a physical uplink shared channel (PUSCH) of at least one terminal device. The first resources include resources occupied by the PUSCH of the at least one terminal device. The communication unit 720 is used for: sending the first downlink control channel having the format.

It should be understood that, the network device 700 may implement corresponding operations performed by the terminal device in the method implementation. For sake of conciseness, the specific description will not be repeated here.

Figure 11:
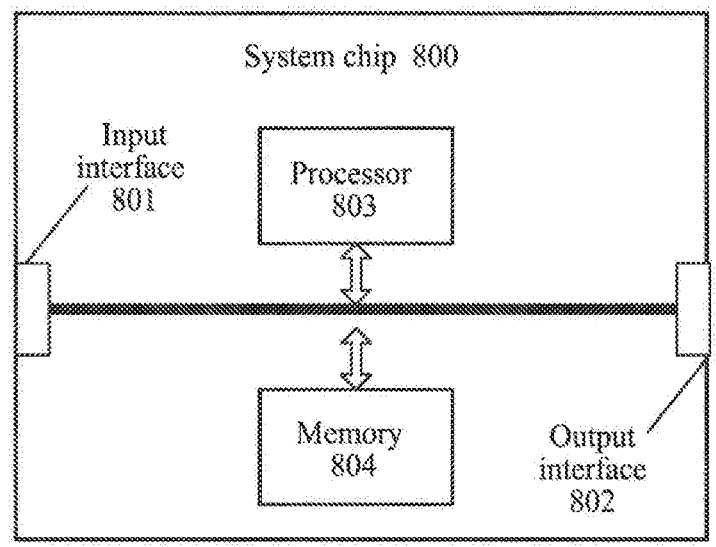
FIG. 11 is a schematic block diagram of a system chip according to an implementation of the present disclosure.

FIG. 11 is a schematic structural diagram of a system chip 800 according to an implementation of the present disclosure. The system chip 800 of FIG. 11 includes an input interface 801, an output interface 802, a processor 803, and a memory 804, which may be connected through internal communication connection lines. The processor 603 is used for executing codes in the memory 804.

Optionally, when the codes are executed, the processor 603 implements the method performed by the network device in the method implementations, which will not be repeated here for sake of conciseness.

Optionally, when the codes are executed, the processor 603 implements the method performed by the terminal device in the method implementations, which will not be repeated here for sake of conciseness.

Figure 12:
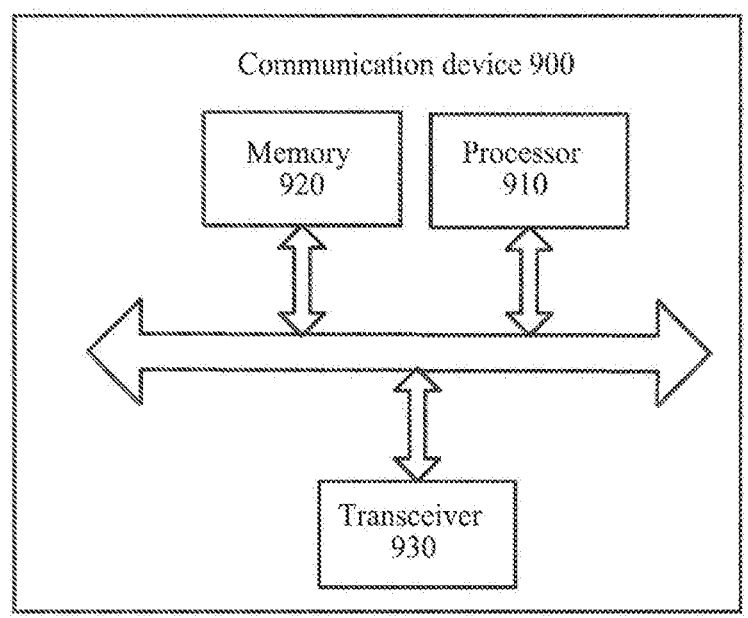
FIG. 12 is a schematic block diagram of a communication device according to an implementation of the present disclosure.

FIG. 12 is a schematic block diagram of a communication device 900 according to an implementation of the present disclosure. As shown in FIG. 12, the communication device 900 includes a processor 910 and a memory 920. The memory 920 may store program codes, and the processor 910 may execute the program codes stored in the memory 920.

Optionally, as shown in FIG. 12, the communication device 900 may include a transceiver 930, and the processor 910 may control the transceiver 930 to communicate with the external.

Optionally, the processor 910 may call the program codes stored in the memory 920 to perform corresponding operations of the network device in the method implementations, which will not be repeated here for sake of conciseness.

Optionally, the processor 910 may call the program codes stored in the memory 920 to perform corresponding operations of the terminal device in the method implementations, which will not be repeated here for sake of conciseness.

It should be understood that the processor in an implementation of the present disclosure may be an integrated circuit chip with a capability for processing signals. In the implementation process, the acts of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The acts of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the acts of the above method in combination with its hardware.

It should be understood that the memory in implementations of the present disclosure may be a volatile memory or non-volatile memory, or may include both volatile and non-volatile memory. The non-volatile memory may be a read-only memory (ROM), programmable ROM (PROM), an erasable programmable ROM (EPROM), an electrically erasable programmable ROM (EEPROM), or a flash memory. The volatile memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will recognize that the example units and algorithm acts described in connection with the implementations disclosed here may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, which will not be repeated here.

In several implementations provided by the present disclosure, it should be understood that the disclosed system, device and method may be implemented in other ways. For example, the apparatus implementations described above are only illustrative. For example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes various media capable of storing program codes, such as a U disk, a mobile hard disk, a mad-only memory (ROM), a random access memory (RAM), a magnetic disk, or an optical disk.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claim is:

1. A method for wireless communication, comprising:
    sending, by a network device, first indication information, wherein the first indication information is used for indicating a format of a first downlink control channel from multiple formats and is carried in a radio resource control (RRC) dedicated signaling, wherein the first downlink control channel is used for carrying hybrid automatic repeat request (HARQ) feedback information directed for a physical uplink shared channel (PUSCH) of at least one terminal device, wherein the multiple formats comprise a first format and a second format, wherein both the first format and the second format comprise at least one bit unit, wherein each bit unit comprises at least one bit and is capable of carrying feedback information of one PUSCH, wherein different bit units are capable of carrying feedback information of different PUSCHs, wherein the number of bit units in the first format is less than the number of bit units in the second format, and wherein the format of the first downlink control channel is used to indicate the first downlink control channel; and sending, by the network device, the first downlink control channel having the format.

2. The method of claim 1, wherein the quantity of the bit units is equal to a ratio of a resource amount of first resources to a granularity of PUSCH division performed on the first resources or a value to which the ratio rounds down.

3. The method of claim 1, wherein the bit unit comprises information of Non-Acknowledge (NACK) or Acknowledge (ACK) of a corresponding PUSCH; or the bit unit comprises information of NACK or ACK of a corresponding PUSCH and an HARQ process number of a PUSCH corresponding to the information of NACK or ACK.

4. A method for wireless communication, comprising:

receiving, by a terminal device, first indication information sent by a network device, wherein the first indication information is used for indicating a format of a first downlink control channel from multiple formats and is carried in a radio resource control (RRC) dedicated signaling, wherein the first downlink control channel is used for carrying hybrid automatic repeat request (HARQ) feedback information directed for a physical uplink shared channel (PUSCH) of at least one terminal device, wherein the multiple formats comprise a first format and a second format, wherein both the first format and the second format comprise at least one bit unit, wherein each bit unit comprises at least one bit and is capable of carrying feedback information of one PUSCH, wherein different bit units are capable of carrying feedback information of different PUSCHs, wherein the number of bit units in the first format is less than the number of bit units in the second format, and wherein the format of the first downlink control channel is used to indicate the first downlink control channel; and detecting, by the terminal device, the first downlink control channel according to the format, and reading the HARQ feedback information of the PUSCH channel of the terminal device in the first downlink control channel.

5. The method of claim 4, wherein the quantity of the bit units is equal to a ratio of a resource amount of first resources to a granularity of PUSCH division performed on the first resources or a value to which the ratio rounds down.

6. The method of claim 4, wherein the bit unit comprises information of Non-Acknowledge (NACK) or Acknowledge (ACK) of a corresponding PUSCH; or the bit unit comprises information of NACK or ACK of a corresponding PUSCH and an HARQ process number of a PUSCH corresponding to the information of NACK or ACK.

7. A network device, comprising a processor and a transceiver; wherein the processor is used for: determining a format of a first downlink control channel, the first downlink control channel is used for carrying hybrid automatic repeat request (HARQ) feedback information directed for a physical uplink shared channel (PUSCH) of at least one terminal device;

the transceiver is used for: sending first indication information, the first indication information is used for indicating the format of the first downlink control channel from multiple formats and is carried in a radio resource control (RRC) dedicated signaling, the multiple formats comprise a first format and a second format, both the first format and the second format comprise at least one bit unit, each bit unit comprises at least one bit and is capable of carrying feedback information of one PUSCH, different bit units are capable of carrying feedback information of different PUSCHs, the number of bit units in the first format is less than the number of bit units in the second format, and the format of the first downlink control channel is used to indicate the first downlink control channel; and the transceiver is further used for: sending the first downlink control channel having the format.

8. The network device of claim 7, wherein the quantity of the bit units is equal to a ratio of a resource amount of first resources to a granularity of PUSCH division performed on the first resources or a value to which the ratio rounds down.

9. The network device of claim 7, wherein the bit unit comprises information of Non-Acknowledge (NACK) or Acknowledge (ACK) of a corresponding PUSCH; or the bit unit comprises information of NACK or ACK of a corresponding PUSCH and an HARQ process number of a PUSCH corresponding to the information of NACK or ACK.

10. A terminal device comprising a processor and a transceiver; wherein the transceiver is used for: receiving first indication information sent by a network device, the first indication information is used for indicating a format of a first downlink control channel from multiple formats and is carried in a radio resource control (RRC) dedicated signaling, the first downlink control channel is used for carrying hybrid automatic repeat request (HARQ) feedback information directed for a physical uplink shared channel (PUSCH) of at least one terminal device, the multiple formats comprise a first format and a second format, both the first format and the second format comprise at least one bit unit, each bit unit comprises at least one bit and is capable of carrying feedback information of one PUSCH, different bit units are capable of carrying feedback information of different PUSCHs, the number of bit units in the first format is less than the number of bit units in the second format, and the format of the first downlink control channel is used to indicate the first downlink control channel;

the processor is used for: detecting the first downlink control channel according to the format, and reading the HARQ feedback information of the PUSCH channel of the terminal device in the first downlink control channel.

11. The terminal device of claim 10, wherein the quantity of the bit units is equal to a ratio of a resource amount of first resources to a granularity of PUSCH division performed on the first resources or a value to which the ratio rounds down.

12. The terminal device of claim 10, wherein the bit unit comprises information of Non-Acknowledge (NACK) or Acknowledge (ACK) of a corresponding PUSCH; or the bit unit comprises information of NACK or ACK of a corresponding PUSCH and an HARQ process number of a PUSCH corresponding to the information of NACK or ACK.

* * * * *